Figure 1:
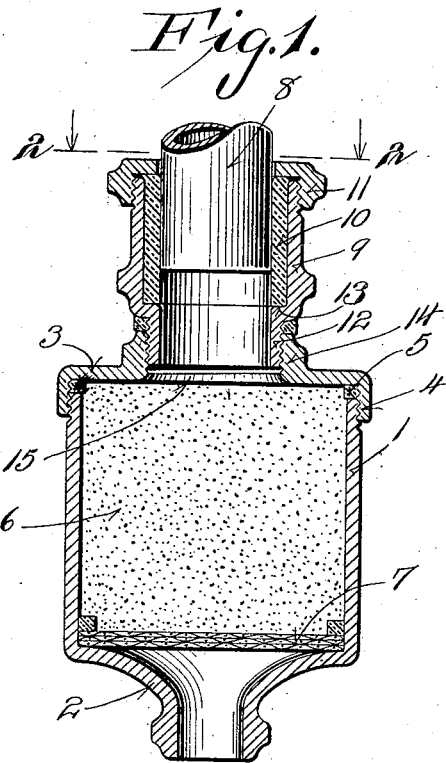

J. AUBERSCHEK.
FILTERING DEVICE.
APPLICATION FILED MAR. 28, 1918.

1,330,420.

Patented Feb. 10, 1920.

Witness
J. P. Britt

Inventor
Joseph Auberschek
By George Young
Attorney

UNITED STATES PATENT OFFICE.

JOSEPH AUBERSCHEK, OF MILWAUKEE, WISCONSIN.

FILTERING DEVICE.

1,330,420.                Specification of Letters Patent.    Patented Feb. 10, 1920.

Application filed March 28, 1918. Serial No. 225,228.

*To all whom it may concern:*

Be it known that I, JOSEPH AUBERSCHEK, a citizen of the United States, and resident of Milwaukee, in the county of Milwaukee and State of Wisconsin, have invented certain new and useful Improvements in Filtering Devices; and I do hereby declare that the following is a full, clear, and exact description thereof.

My present invention relates to filters, more particularly to that type which is adapted for use in homes and other domestic places.

The primary object of my invention is to improve upon the construction of devices of this character and procure a consequent reduction in the cost of manufacture and use and an increase in the efficiency thereof.

It is also an object of this invention to provide my improved filter with an efficient means for connecting it with the spout of a faucet.

A further object is to provide a device of this general character in which various forms of filtering beds may be used.

Figure 2:
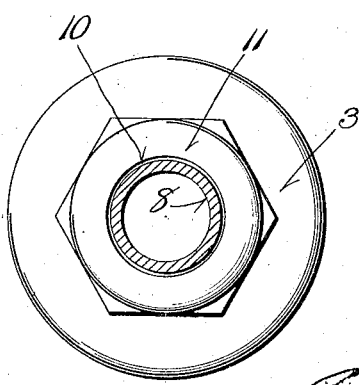

With these and other objects in view and other meritorious features which will appear as the description proceeds, the invention resides in certain combinations of parts which will be hereinafter more particularly described and claimed and shown in the drawing, in which:

Figure 1 represents a vertical sectional view through a filtering device constructed in accordance with my invention, and Fig. 2 is a horizontal sectional view taken substantially on the plane of the line 2—2 of Fig. 1.

In the preferred embodiment of my invention as illustrated in the drawing, the filter proper consists of a casing 1 which is substantially cylindrical and has a restricted outlet spout 2 formed integrally with its bottom, and a screw cap 3, the down-turned internally screw threaded flange 4 of which is engaged with the screw threads on the casing as shown in Fig. 1. A gasket 5 is interposed between the upper open end of the casing 1 and the screw cap 3 for an obvious purpose.

The container formed by these parts is adapted to inclose a filtering bed 6 which may be constructed of sand or any other similar or suitable material, for instance cloth. Filtering material of a finely divided nature is retained within the casing 1 by means of several thicknesses of perforated or reticulated plates or screens 7 disposed across the outlet spout 2.

This filter is adapted to be retained on the spout 8 of a faucet (not shown) by means of an improved connection which includes a substantially cylindrical coupling 9 of metal, a bushing or sleeve 10 of rubber or similar flexible and expansible composition, and a gland 11. The coupling 9 has its lower end cylindrically contracted to form a neck 12, which is externally threaded, and an annular shoulder 13. The bushing or sleeve 10 is disposed within the coupling and is seated on the annular shoulder 13, the inner diameter of said bushing or sleeve being substantially similar to that of the neck 12.

In disposing this connection on the spout 8, the latter is forced into the bushing or sleeve 10 for a sufficient distance, whereupon the gland 11 is screwed on the upper threaded end of the coupling 9 and into engagement with the upper edge of said sleeve 10 which, being normally extended slightly beyond the adjacent edge of the coupling 9, will be forced inwardly to tightly engage the surface of said spout. The frictional engagement between the sleeve 10 and said spout will be considerable and may be increased or diminished by rotation of the gland 11 in the proper direction.

The casing 1 which holds the filtering bed is secured to the neck 12 of the coupling by means of the internally threaded boss 14 which is formed integrally with the top of the screw cap 3 and surrounds an opening 15 therein. The filter may thus be readily removed from the faucet without detaching the coupling from the latter. Said coupling may obviously also be used for attaching a hose or the like to a faucet spout having a smooth outer wall, when the filtering device is detached.

Owing to the ease with which the various parts of my invention may be separated, the filtering bed may be frequently and easily changed, and furthermore the parts may be readily cleaned and kept in perfect condition. Various minor changes may be made in the form and proportion of the several parts of my invention without departing from the purpose of the same.

I claim:—

A coupling of the class described, a tubular member having one end portion reduced to form consequent inner and outer peripheral shoulders, a packing ring disposed on said reduced end portion and engaging the outer peripheral shoulder, a connecting filter cap member threaded on said reduced end portion and engaging said packing ring, a cylindrical packing member disposed in the tubular member, one end of said packing member engaging the inner peripheral shoulder and the other end of said packing member extending outwardly of the tubular member, said packing member being adapted to receive therein a member to be coupled and a cap threaded on the tubular member and engaging said packing member to compress the same against a member disposed therein.

In testimony that I claim the foregoing I have hereunto set my hand at Milwaukee, in the county of Milwaukee and State of Wisconsin.

JOSEPH AUBERSCHEK.